(12) United States Patent
Onuma et al.

(10) Patent No.: US 8,567,152 B2
(45) Date of Patent: Oct. 29, 2013

(54) CUSHION MATERIAL FASTENING STRUCTURE FOR INTERIOR TRIM PART

(75) Inventors: Kenji Onuma, Toyota (JP); Shunsuke Koike, Toyota (JP); Hideaki Sakai, Toyota (JP)

(73) Assignee: Toyoda Iron Works Co., Ltd., Toyota (JP)

( * ) Notice: Subject to any disclaimer, the term of this patent is extended or adjusted under 35 U.S.C. 154(b) by 575 days.

(21) Appl. No.: 12/656,158

(22) Filed: Jan. 20, 2010

(65) Prior Publication Data

US 2010/0189494 A1    Jul. 29, 2010

(30) Foreign Application Priority Data

Jan. 26, 2009  (JP) ................................. 2009-014799
Jan. 26, 2009  (JP) ................................. 2009-014818

(51) Int. Cl.
*E04C 2/38* (2006.01)
*B60R 13/04* (2006.01)

(52) U.S. Cl.
CPC ..................................... B60R 13/04 (2013.01)
USPC ....................................................... 52/716.5

(58) Field of Classification Search
USPC .......... 52/716.1, 716.3, 716.4, 716.5, 717.05, 52/717.06, 63, 222, 506.05, 511, 710; 296/146.7, 1.08
See application file for complete search history.

(56) References Cited

U.S. PATENT DOCUMENTS

| | | | | |
|---|---|---|---|---|
| 4,926,605 A | * | 5/1990 | Milliken et al. | ................... 52/63 |
| 6,814,382 B2 | | 11/2004 | Kohara et al. | |
| 7,559,598 B2 | * | 7/2009 | Steelman | ................... 296/146.7 |
| 8,122,665 B2 | * | 2/2012 | Stanchfield et al. | ............ 52/468 |
| 8,161,708 B2 | * | 4/2012 | Schacht et al. | ............. 52/717.04 |
| 2004/0081537 A1 | | 4/2004 | Nishikawa | |
| 2004/0135394 A1 | * | 7/2004 | Clauson | ..................... 296/146.7 |
| 2005/0102915 A1 | * | 5/2005 | Echtler | .............................. 52/63 |
| 2006/0150565 A1 | * | 7/2006 | Schacht et al. | ............... 52/716.1 |

FOREIGN PATENT DOCUMENTS

| | | |
|---|---|---|
| JP | U-06-058800 | 8/1994 |
| JP | A-07-163792 | 6/1995 |
| JP | A-07-310721 | 11/1995 |
| JP | A-10-264735 | 10/1998 |
| JP | A-2000-117928 | 4/2000 |
| JP | A-2000-352408 | 12/2000 |
| JP | A-2001-260765 | 9/2001 |
| JP | A-2003-81021 | 3/2003 |
| JP | A-2004-069004 | 3/2004 |
| JP | A-2004-090680 | 3/2004 |

(Continued)

OTHER PUBLICATIONS

Japanese Office Action issued in Japanese Patent Application No. 2009-014799 dated Sep. 6, 2011 (with partial translation).
Japanese Office Action issued in Japanese Patent Application No. 2009-014818 dated Sep. 6, 2011 (with partial translation).

(Continued)

*Primary Examiner* — William Gilbert
*Assistant Examiner* — Kyle Walraed-Sullivan
(74) *Attorney, Agent, or Firm* — Oliff & Berridge, PLC (57) ABSTRACT

A cushion material fastening structure includes: an interior trim part, made of synthetic resin, that is provided with an opening and an elastic deformation portion at least part of which projects inward in the opening; and a cushion material, having a sheet shape, that is caught by the elastic deformation portion by being plunged into the opening while elastically deforming the elastic deformation portion, whereby the cushion material is fastened to the interior trim part.

11 Claims, 9 Drawing Sheets

(56) References Cited

FOREIGN PATENT DOCUMENTS

| | | |
|---|---|---|
| JP | A-2005-076646 | 3/2005 |
| JP | U-3125636 | 9/2006 |
| JP | A-2006-281952 | 10/2006 |
| JP | A-2007-145086 | 6/2007 |

OTHER PUBLICATIONS

Office Action issued in Japanese Application No. 2009-014799 dated Apr. 26, 2011 (w/ English Translation).
Office Action issued in Japanese Application No. 2009-014818 dated Apr. 26, 2011 (w/ English Translation).

* cited by examiner

CUSHION MATERIAL FASTENING STRUCTURE FOR INTERIOR TRIM PART

INCORPORATION BY REFERENCE

The disclosure of Japanese Patent Application No. 2009-014799 filed on Jan. 26, 2009 and Japanese Patent Application No. 2009-014818 filed on Jan. 26, 2009, including the specification, drawings and abstract, is incorporated herein by reference in its entirety.

BACKGROUND OF THE INVENTION

1. Field of the Invention

The invention relates to a cushion material fastening structure for an interior trim part, and in particular to a cushion material fastening structure that makes it possible to easily fasten the cushion material without requiring high accuracy in positioning and is therefore excellent in workability.

2. Description of the Related Art

A cushion material that has a certain function of sound insulation, shock absorption, etc. is provided on a back side of an interior trim part, such as a vehicle door trim, for example. Japanese Patent Application Publication No. 2003-81021 (JP-A-2003-81021) gives an example, in which holes or slits are provided in the cushion material and fastening protrusions on the interior trim part side are inserted into the holes or the slits, whereby the cushion material is fastened by the fastening protrusions or catching teeth provided on the fastening protrusions.

However, when the cushion material is fastened by providing the cushion material with the holes or the like and inserting the fastening protrusions on the interior trim part side into the holes, the fastening operation has to be performed after relative positioning between the cushion material and the interior trim part, and therefore, the workability is not satisfactory in some cases. In addition, because of the variations in the positions of the holes or the like, there is a possibility that the position of fastening of the cushion material to the interior trim part is deviated and looseness due to this positional deviation occurs.

SUMMARY OF THE INVENTION

The invention has been made under such circumstances and an object of the invention is to make it possible to easily and properly fasten a cushion material at a desired fastening position without requiring high accuracy in positioning.

In order to achieve such an object, a first aspect of the invention is a cushion material fastening structure including: an interior trim part, made of synthetic resin, that is provided with an opening and an elastic deformation portion at least part of which projects inward in the opening; and a cushion material, having a sheet shape, that is caught by the elastic deformation portion by being plunged into the opening while elastically deforming the elastic deformation portion, whereby the cushion material is fastened to the interior trim part.

A second aspect of the invention is characterized in that (a) the interior trim part is provided with a pair of a plate-shaped catching protrusion and a plate-shaped holding portion, at least one of which functions as the elastic deformation portion, the catching protrusion being provided with a catching lug that projects toward the holding portion in such a manner that the opening is formed between the catching protrusion and the holding portion, and (b) the cushion material is plunged into the opening while one of or both of the catching protrusion and the holding portion are elastically deformed, and an insertion portion of the cushion material that is inserted into the opening is thus caught in a state where the insertion portion is pinched between the catching lug and the holding portion.

A third aspect of the invention is characterized in that in the cushion material fastening structure for an interior trim part according to the second aspect of the invention, the holding portion is also provided with a catching lug that projects toward the catching protrusion substantially symmetrically with the catching lug provided for the catching protrusion, and the opening is formed between tips of the respective catching lugs of the catching protrusion and the holding portion.

A fourth aspect of the invention is characterized in that in the cushion material fastening structure for an interior trim part according to the second aspect of the invention, the holding portion is a peripheral wall or a rib of the interior trim part.

A fifth aspect of the invention is characterized in that in the cushion material fastening structure for an interior trim part according to the second to fourth aspects of the invention, a plurality of triangular teeth are continuously provided at a tip of the catching lug.

A sixth aspect of the invention is characterized in that (a) the elastic deformation portion is a plurality of catching teeth that project inward in the opening, and (b) the cushion material is plunged into the opening at a central area of the opening while the plurality of catching teeth are elastically deformed, and an insertion portion of the cushion material that is plunged into the opening is thus caught by the plurality of catching teeth and prevented from being detached.

A seventh aspect of the invention is characterized in that in the cushion material fastening structure for an interior trim part according to the sixth aspect of the invention, the plurality of catching teeth include at least two pairs of the catching teeth provided around the center of the opening at equal angular intervals, each pair of the catching teeth including two catching teeth that are provided symmetrically with respect to the center of the opening.

According to the cushion material according to the first aspect of the invention, the cushion material is fastened to the interior trim part by placing the cushion material on the interior trim part and then plunging, into the opening, the portion of the cushion material over the opening, so that it is possible to easily and properly fasten a cushion material at a desired fastening position without requiring high accuracy in positioning.

In the cushion material fastening structure according to the second aspect of the invention as described above, the interior trim part is provided with a pair of a plate-shaped catching protrusion and a plate-shaped holding portion, at least one of which functions as the elastic deformation portion, the catching protrusion being provided with a catching lug, and the cushion material is plunged into the opening formed between the catching lug and the holding portion, so that an insertion portion of the cushion material that is inserted into the opening is caught in a state where the insertion portion is pinched between the catching lug and the holding portion. Thus, it is possible to fasten a cushion material by placing it flat at the predetermined position on an interior trim part and plunging the portion of the cushion material, positioned above the opening, into the opening with the use of an insertion tool or the like, so that it is possible to easily and properly fasten the cushion material at the desired fastening position without requiring high accuracy in positioning.

In the third aspect of the invention, the holding portion is also provided with a catching lug, and the opening is formed between tips of the respective catching lugs of the catching protrusion and the holding portion. Thus, the insertion portion, which is the portion plunged into the opening between the catching lugs is pinched from both sides by the catching lugs, so that the insertion portion is more firmly fastened and prevented from being detached.

In the fourth aspect of the invention, the holding portion is a peripheral wall or a rib that the interior trim part originally has. Thus, it suffices to add the catching protrusion having the catching lug. Accordingly, the fourth aspect of the invention is spatially advantageous and the degree of freedom of design is high, and at the same time, the costs of the material for the interior trim part are reduced.

In the fifth aspect of the invention, the plurality of triangular teeth are continuously provided at the tip of the catching lug. Thus, the plurality of teeth bite into the cushion material that is plunged into the opening, whereby the cushion material is more firmly fastened and prevented from being detached.

In the sixth aspect of the invention, the elastic deformation portion is a plurality of catching teeth that project inward in the opening, and the cushion material is plunged into the opening at a central area of the opening while the plurality of catching teeth are elastically deformed, and an insertion portion of the cushion material is thus caught by the plurality of catching teeth and prevented from being detached. Thus, it is possible to fasten a cushion material by placing it flat at the predetermined position on an interior trim part and plunging the portion, positioned above the center of the opening, into the opening with the use of a plunging tool or the like, so that it is possible to easily and properly fasten the cushion material at the desired position without requiring high accuracy in positioning.

In the seventh aspect of the invention, the plurality of catching teeth include at least two pairs of the catching teeth provided around the center of the opening at equal angular intervals, each pair of the catching teeth including two catching teeth that are provided symmetrically with respect to the center of the opening. Thus, the insertion portion, which is the portion plunged into the opening at the central area of the opening, is caught such that the insertion portion is symmetrically held by the at least two pairs of the catching teeth, that is, the four or more catching teeth, from opposing sides. Accordingly, the force of preventing detachment of the insertion portion, that is, the strength against removal of the cushion material is obtained substantially evenly around the center of the opening and the cushion material is more firmly fastened and prevented from being detached from the interior trim part.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

The invention is suitably used when a cushion material having a certain function of sound insulation, shock absorption, etc. is fastened on a back side of a vehicle trim part, such as a door trim, a luggage side trim, a pillar trim, or an interior trim panel for one of various portions. However, the invention can also be used when a cushion material is fastened to an interior trim part for the purpose other than vehicles. The cushion material is a sheet-shaped material or a soft board material that can be folded and is flexible, such as a felt or soft polyurethane foam.

First to third embodiments of the invention will be described below. In the first to third embodiments, at least one of a plate-shaped catching protrusion, a plate-shaped holding portion, and a catching lug can be elastically deformed and these constituent elements function as the elastic deformation portion of the invention.

In the first to third embodiments, a cushion material fastening structure of the invention is applied to each of a plurality of fastening portions, for example, and the cushion material is fastened to the interior trim part at the plurality of fastening portions. However, the cushion material may be fastened to the interior trim part at a single fastening portion using the cushion material fastening structure of the invention.

Although a pair of a plate-shaped catching protrusion and holding portion, which are straight in a plan view, are provided in parallel with each other, for example, the plate-shaped catching protrusion and holding portion may be provided so as to be inclined with respect to each other, in the shape of the Chinese character for "eight" in a plan view. Each of the plate-shaped catching protrusion and holding portion may have a convex arc shape or a concave arc shape in a plan view. Various modes may be adopted as long as an opening is formed between the tip of a catching lug and a holding portion. With regard to the opening, as long as the cushion material can be plunged between the catching tooth and the holding portion, various modes can be adopted, in which the tip portion of the catching protrusion and the tip portion of the holding portion is in contact with each other or when these tip portions are not in contact with each other, the width (space) of a narrow, slit-like opening is substantially constant or the width is gradually decreased or increased in the direction from one end of the slit to the other end thereof, for example.

A plurality of pairs of the catching protrusion and the holding portion may be provided such that the pairs of the catching protrusion and the holding portion form a circular shape, a polygonal shape, a rhombus shape, etc. in a plan view. As the shape of the opening, various shapes, such as a circular shape, a polygonal shape or a rhombus shape, other than the narrow, slit-like shape, may be adopted. A plurality of holding portions may be provided for one catching protrusion, or a plurality of catching protrusions may be provided for one holding portion.

The pair(s) of the catching protrusion and the holding portion is(are) formed integrally with the interior trim part by injection molding, for example. However, the pair(s) of the catching protrusion and the holding portion may be formed separately and fixed integrally to the interior trim part by insert molding; adhesion, welding, etc. It is desirable to form the catching lug integrally with one of or each of the catching protrusion and the holding portion, and therefore, the catching protrusion and the holding portion are formed as a whole in an L shape bent at a substantially right angle, for example. The interior trim part has a flat portion, for example, and the catching protrusion and the holding portion are provided on the flat portion so as to stand substantially perpendicularly to the flat portion. However, the catching protrusion and the holding portion may be provided in a standing condition such that the catching protrusion and the holding portion are inclined to come closer to each other with the distance from the flat portion.

Note that although the holding portion is a peripheral wall or a rib that is originally provided on the interior trim part in a mode of the invention, a plate-shaped holding portion (with no catching lug) prepared to fasten the cushion material may be provided.

Although a plurality of triangular teeth are continuously provided at the tip of the catching lug in a mode of the invention, a single triangular tooth may be provided, or otherwise, a configuration may be adopted in which no triangular tooth is provided.

When the cushion material is plunged into the opening, one of or both of the pair of the catching protrusion and the holding portion are elastically deformed such that the opening is widened, and the cushion material is held between the catching lug and the holding portion by the elastic restoring force. When the catching lug is provided, a configuration may be adopted, in which only the catching lug is elastically deformed, only the portion that stands on the interior trim part is elastically deformed, or both of the catching lug and such a standing portion are elastically deformed.

Although the catching lugs may merely project toward each other substantially in parallel with the interior trim part, when the tip portion side with respect to the middle portion of each of the catching lugs is inclined toward the interior trim part, the operation to plunge the cushion material into the opening is facilitated and at the same time, the cushion material is well caught by the catching lugs when a force in the direction of detachment is applied to the cushion material, so that detachment of the cushion material is more effectively prevented and the cushion material is therefore fastened firmly.

Depending on the material for the cushion material, there is a possibility that when the cushion material is plunged into an opening, a tension (tensile force) in the direction in which other portions of the cushion material are drawn toward the opening is generated and a positional deviation of the cushion material is therefore caused. For this reason, it is preferable that a cut or an aperture be provided in advance near the portion that is plunged into the opening and when the cushion material is plunged into the opening, the cut or the aperture is opened to relax the tension, so that the positional deviation of the cushion material is suppressed. Although a plurality of cuts or apertures can be provided around the plunged portion of the cushion material, the cut or the aperture may be provided at a single portion. The cut or the aperture has only to be provided near the plunged portion, and therefore, high positional accuracy is not necessarily required.

Figure 1A:
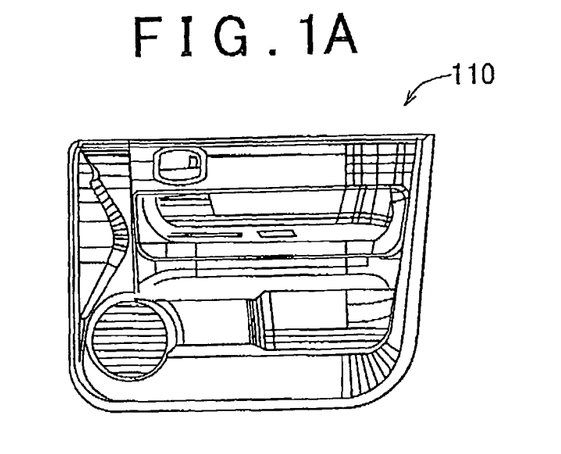
FIG. 1A is a schematic diagram showing a design surface side of an example of a vehicle door trim to which the invention is applied.
Figure 1B:
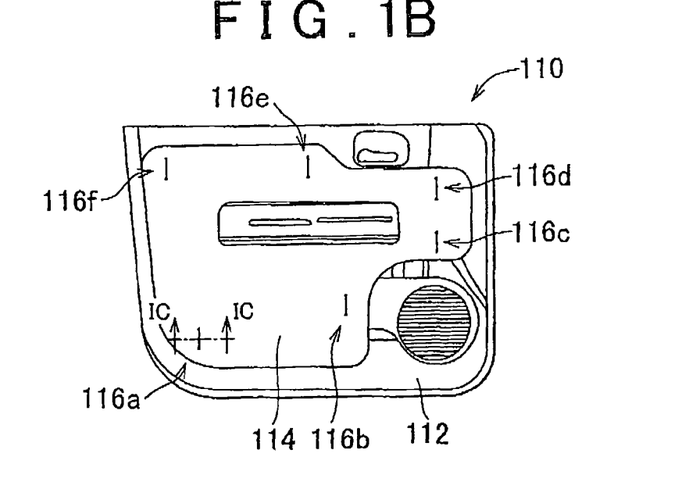
FIG. 1B is a schematic diagram showing a back side of the example of the vehicle door trim to which the invention is applied.
Figure 1C:
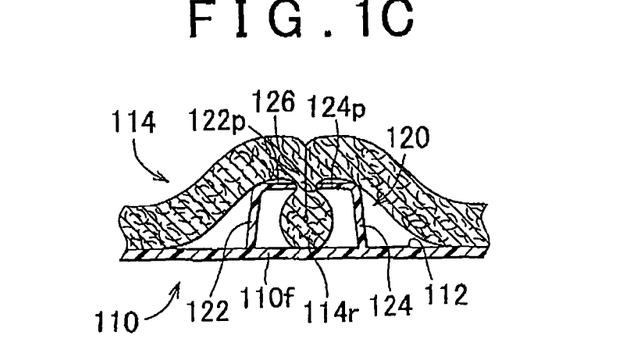
FIG. 1C is an enlarged view of the section IC-IC in FIG. 1B.

A first embodiment of the invention will be described in detail below with reference of drawings. FIGS. 1A to 1C are schematic diagrams showing a vehicle door trim 110 to which the invention is applied. FIG. 1A is a front view showing a design surface side, that is, the vehicle's cabin side of the door trim. FIG. 1B is a back view showing the opposite, back side of the door trim. FIG. 1C is an enlarged view of the section IC-IC in FIG. 1B. The vehicle door trim 110 corresponds to the interior trim part. The vehicle door trim 110 is integrally formed of a synthetic resin material and a cushion material 114 is fastened to a back side 112 of the vehicle door trim 110 that is positioned inside a door (outer side with respect to the vehicle's cabin). The cushion material 114 is a flexible, sheet-shaped material, such as a felt, having a function of sound insulation or shock absorption. In the first embodiment, the cushion material 114 is caught by pinch portions 120 that are provided integrally on the vehicle door trim 110 at six fastening portions 116a to 116f in the peripheral area, so that the cushion material 114 is integrally fastened.

Figure 2:
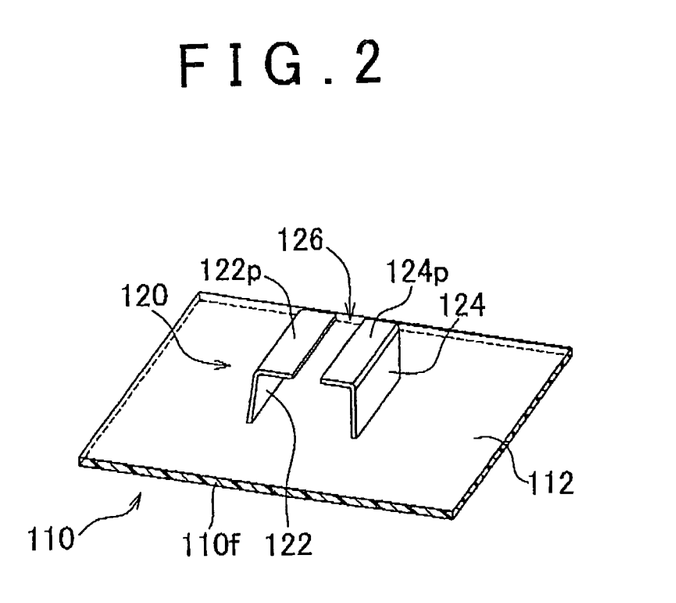
FIG. 2 is a perspective view showing a pinch portion provided to fasten a cushion material to the back side of the vehicle door trim shown in FIGS. 1A to 1C.

FIG. 2 is a perspective view showing the portion of the vehicle door trim 110, in which the pinch portion 120 is provided. The pinch portion 120 includes a pair of a plate-shaped catching protrusion 122 and holding protrusion 124 that are provided so as to stand substantially perpendicularly on a flat portion 110f of the vehicle door trim 110 and are substantially parallel with each other. In the first embodiment, the catching protrusion 122 and the holding protrusion 124 are provided in parallel with each other in a plan view viewed from the direction perpendicular to the flat portion 110f. In addition, the catching protrusion 122 and the holding protrusion 124 are slightly inclined inwardly so as to become closer to each other with the distance from the flat portion 110f, that is, toward the tip side thereof. The holding protrusion 124 functions as the holding portion.

The catching protrusion 122 and the holding protrusion 124 are substantially L-shaped, which have symmetrically provided catching lugs 122p and 124p, respectively. The catching lugs 122p and 124p are the portions bent at a substantially right angle so as to project toward the opposing protrusions 124 and 122, respectively, in parallel with the flat portion 110£ Between the tips of the catching lugs 122p and 124p, a narrow, slit-like gap 126, of which the width is substantially constant, is formed. The cushion material 114 is plunged into the slit-like gap 126 with the cushion material 114 folded by 180° while the catching protrusion 122 and the holding protrusion 124 are elastically deformed, so that an insertion portion (folded portion) 114r folded in this way is caught in a state where the insertion portion 114r is pinched between the catching lugs 122p and 124p on both sides. The folded insertion portion 114r functions as the insertion portion and the gap 126 functions as the opening.

Figure 3A:
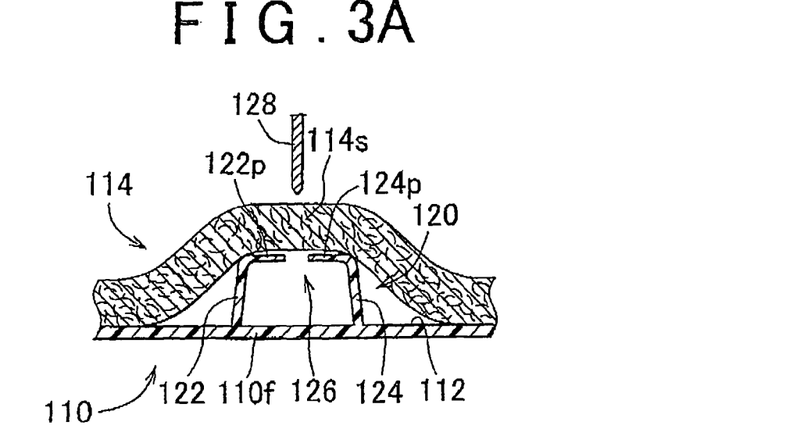
FIGS. 3A to 3C are diagrams, which show sectional views corresponding to FIG. 1C, for explaining a procedure for fastening the cushion material in such a manner that the cushion material is pinched by the pinch portion shown in FIG. 2.
Figure 3B:
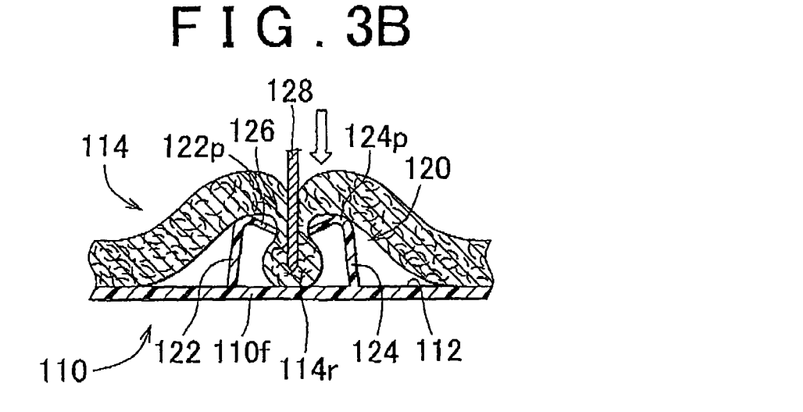
Figure 3C:
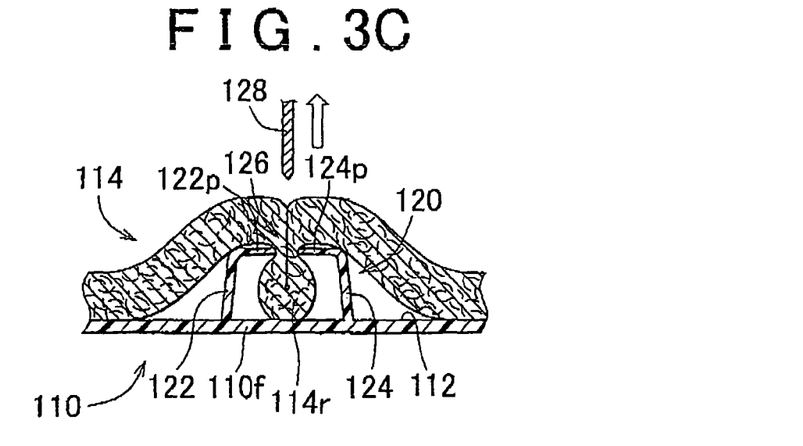

FIGS. 3A to 3C are diagrams for explaining the procedure for fastening the cushion material 114 such that the cushion material 114 is pinched by the pinch portion 120. First, as shown in FIG. 3A, the cushion material 114 is placed flat at the predetermined position on the vehicle door trim 110 that is placed upside down so that the back side 112 faces upward. Then, a plate-like, or knife-like, insertion tool 128 that fits for the slit-like gap 126 is used to plunge, into the gap 126, a plunged portion 114s that is positioned directly above the gap 126, as shown in FIG. 3B. When the cushion material 114 is plunged into the slit-like gap 126, mainly, the catching lugs 122p and 124p are elastically deformed downward so that the gap 126 is widened, whereby the folded insertion portion 114r is inserted into the substantially rectangular space surrounded by the flat portion 110f, the catching protrusion 122 and the holding protrusion 124. The folded insertion portion 114r is pinched between the pair of the catching lugs 122p and 124p by the elastic restoring force of the catching lugs 122p and 124p, so that the folded insertion portion 114r of the cushion material 114 is caught by the catching lugs 122p and 124p so as to be prevented from being detached even when the insertion tool 128 is pulled out upward as shown in FIG. 3C.

Although the insertion tool 128 may be manually operated by an operator under visual observation to plunge the cushion material 114 into the gap 126, the insertion tools 128 may be fixed in advance, above the assembling table on which the vehicle door trim 110 is positioned and placed at the predetermined position, at the predetermined points on a movable block that is lifted up and down by a driving device, such as an air cylinder or a feeding screw mechanism, that is, directly above the gaps 126, and the cushion material 114 may be plunged into the gaps 126 by moving down the movable block. When the insertion tools 128 are installed at the six positions corresponding to the fastening portions 116a to 116f, it is possible to plunge the cushion material 114 into the gaps 126 at the six fastening portions 116a to 116f at the same time to fasten the cushion material 114 at the pinch portions 120.

As described above, the plurality of pinch portions 120 are integrally provided, corresponding to the plurality of fastening portions 116a to 116 on the back side 112 of the vehicle door trim 110 in the first embodiment, and the cushion material 114 is integrally fastened at the plurality of fastening portions 116a to 116f In this case, each of the pinch portions 120 includes the pair of the plate-shaped catching protrusion 122 and holding protrusion 124 having the symmetrically provided catching lugs 122p and 124p that are the portions bent at a substantially right angle. The cushion material 114 is plunged into the slit-like gap 126 formed between the tips of the catching lugs 122p and 124p with the cushion material 114 folded by 180° while the catching lugs 122p and 124p are elastically deformed, so that the folded insertion portion 114r is caught in a state where the insertion portion 114r is pinched between the catching lugs 122p and 124p. Thus, it is possible to fasten the cushion material 114 by placing it flat at the predetermined position on the vehicle door trim 110 and plunging the plunged portion 114s, positioned above the slit-like gap 126, into the gap 126 with the use of the insertion tool 128 as shown in FIGS. 3A to 3C, so that it is possible to easily and properly fasten the cushion material 114 at the predetermined fastening position without requiring high accuracy in positioning.

In the first embodiment, the pair of the catching protrusion 122 and the holding protrusion 124 both are provided with the catching lugs 122p and 124p, respectively, and the slit-like gap 126 is formed between the tips of the catching lugs 122p and 124p of both protrusions 122 and 124. Thus, the folded insertion portion 114r, which is the portion plunged into the gap 126 between the catching lugs 122p and 124-p is pinched from both sides by the catching lugs 122p and 124p, so that as compared to the case where such a portion is caught on one side only as shown in FIGS. 4A and 4B, the folded insertion portion 114r is more firmly fastened and prevented from being detached.

Next, a second embodiment of the invention will be described. In the following description of the second embodiment, the portions substantially the same as the corresponding portions of the first embodiment are designated by the same reference numerals and the detailed description thereof will be omitted.

Figure 4A:
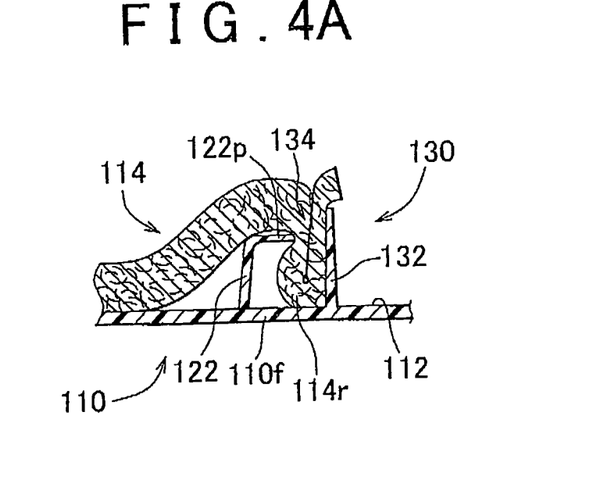
FIGS. 4A and 4B are diagrams, which show sectional views corresponding to FIG. 1C, for explaining other embodiments of the invention.
Figure 4B:
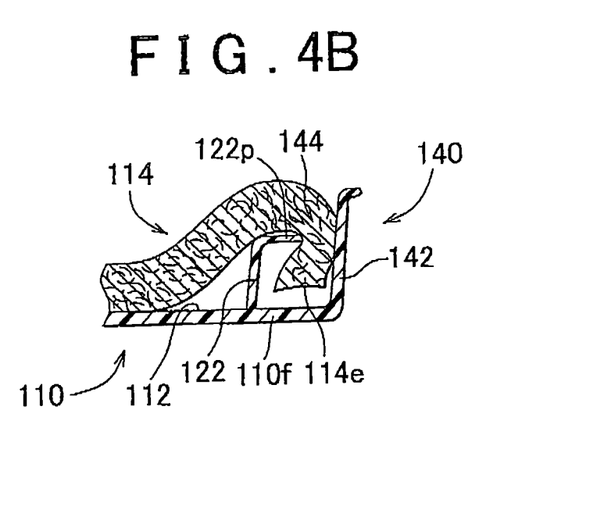

FIGS. 4A and 4B show the cases in either of which the cushion material 114 is caught by the catching lug 122p provided for the catching protrusion 122. A pinch portion 130 shown in FIG. 4A uses a rib 132 originally provided on the vehicle door trim 110 instead of providing the holding protrusion 124 and, upon plunging the cushion material 114 into a slit-like gap 134 between the rib 132 and the catching lug 122p, the plunged, folded insertion portion 114r is caught by the catching lug 122p and prevented from being detached. A pinch portion 140 shown in FIG. 4B uses a peripheral wall 142 originally provided on the vehicle door trim 110 and, upon plunging an edge portion 114e of the cushion material 114 into a slit-like gap 144 between the peripheral wall 142 and the catching lug 122p, the plunged, edge portion 114e is caught by the catching lug 122p and prevented from being detached. The rib 132 and the peripheral wall 142 function as the holding portion and the edge portion 114e functions as the insertion portion.

In these embodiments, the rib 132 or the peripheral wall 142 originally provided on the vehicle door trim 110 is used as the holding portion and therefore, it suffices to add the catching protrusion 122 having the catching lug 122p. Thus, these embodiments are spatially advantageous and the degree of freedom of design is increased, and at the same time, the costs of the material for the vehicle door trim 110 are reduced.

Next, a third embodiment of the invention will be described. In the following description of the third embodiment, the portions substantially the same as the corresponding portions of the first embodiment are designated by the same reference numerals and the detailed description thereof will be omitted.

Figure 5:
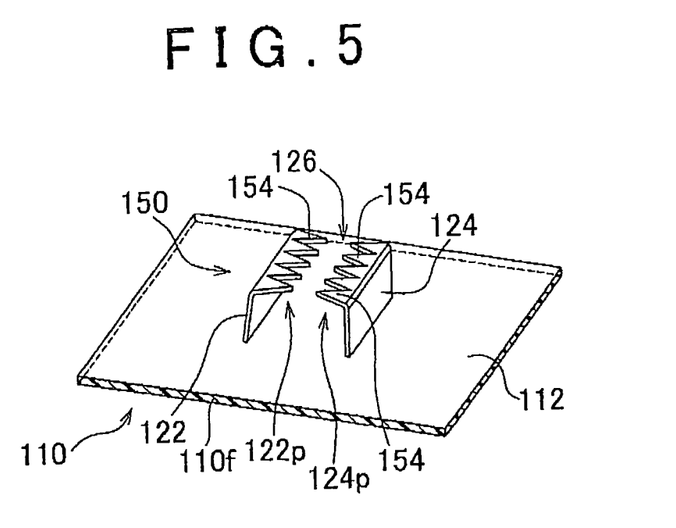
FIG. 5 is a diagram, which shows a perspective view corresponding to FIG. 2, for explaining another embodiment of the invention.

FIG. 5, corresponding to FIG. 2, is a perspective view showing a pinch portion 150. The pinch portion 150 has a plurality of triangular teeth 154 continuously provided at the tip of each of the catching lugs 122p and 124p of the catching protrusion 122 and the holding protrusion 124. In this case, the plurality of teeth 154 bite into the cushion material 114 that is plunged into the slit-like gap 126, whereby the folded insertion portion 114r is more firmly fastened and prevented from being detached.

Figure 6A:
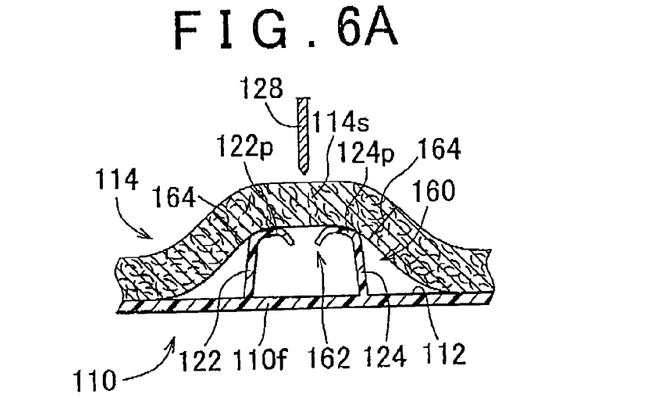
FIGS. 6A to 6C are diagrams, which show sectional views corresponding to FIG. 1C, for explaining still another embodiment of the invention.
Figure 6B:
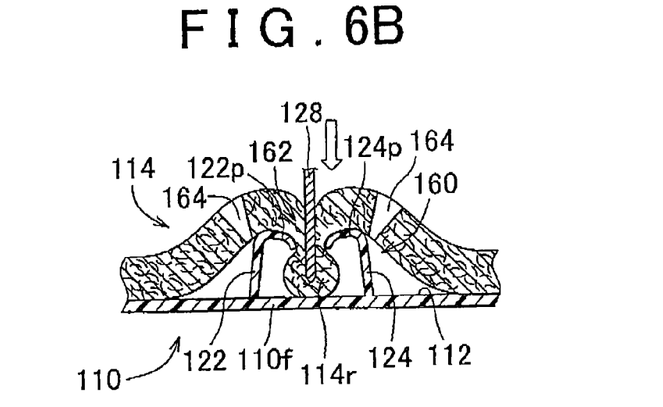
Figure 6C:
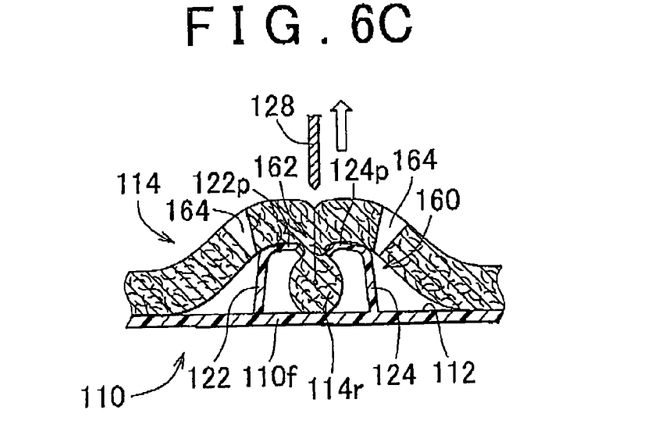

FIGS. 6A to 6C are sectional views corresponding to FIG. 1C, and in a pinch portion 160 shown therein, the portions on the tip side of the middle portions of the catching lugs 122p and 124p of the catching protrusion 122 and the holding protrusion 124 are inclined toward the flat portion 110f. In this case, the operation to plunge the cushion material 114 into a slit-like gap 162 is facilitated and at the same time, the cushion material 114 is well caught by the catching lugs 122p and 124p when a force in a direction of detachment is applied to the folded insertion portion 114r of the cushion material 114, so that detachment of the folded insertion portion 114r is more effectively prevented and the cushion material 114 is therefore fastened firmly.

In the third embodiment shown in FIGS. 6A to 6C, a cut 164 is formed in advance near the plunged portion 114s of the cushion material 114. When the plunged portion 114s is plunged into the gap 162, the cut 164 is opened, so that the tension (tensile force) applied in the direction in which other portions of the cushion material 114 are drawn toward the gap 162 is relaxed and the positional deviation of the cushion material 114 is suppressed. In the third embodiment, a pair of the cuts 164 that are substantially parallel with the gap 162 are formed at opposing two sides of the plunged portion 114s. When the cushion material 114 is in an installed state as shown in FIG. 6C, the cuts 164 are opened and the middle portion between the openings has been plunged into the gap 162 as the folded insertion portion 114r and caught by the catching lugs 122p and 124p.

Next, a fourth embodiment of the invention will be described. In the fourth embodiment, a plurality of catching teeth function as the elastic deformation portion of the invention and a plunge hole functions as the opening of the invention.

Also in the fourth embodiment, the cushion material fastening structure of the invention is applied to each of a plurality of fastening portions of an interior trim part, for example, and the cushion material is fastened to the interior trim part at the plurality of fastening portions. However, the cushion material may be fastened to the interior trim part at a single fastening portion using the cushion fastening structure of the invention.

A plurality of catching teeth may be provided around the center of a plunge hole at predetermined intervals (spaces). However, the plurality of catching teeth may be provided such that cuts, slits, or the like are simply provided radially to make a plurality of catching teeth separated, and the plurality of catching teeth are almost in contact with each other in a natural state before the cushion material is plunged. In short, it suffices that when the cushion material is plunged into the plunge hole at the central area thereof, that is, at the central area of the plurality of catching teeth, the catching teeth are elastically bent, allowing the cushion material to be plunged, the insertion portion is caught by the catching teeth due to the elastic restoring force, and the insertion portion is prevented from being detached by a predetermined detachment prevention force. Although the plunge hole is substantially circular, for example, the plunge hole may be polygonal or elliptical depending on the number of catching teeth.

In a mode of the invention, the plurality of teeth are provided symmetrically with respect to the center of the plunge hole, so that the plurality of teeth symmetrically hold the insertion portion from respective opposing sides and prevent the insertion portion from being detached. However, various modes can be adopted, in which, for example, an odd number of teeth may be provided around the center of the plunge hole at equal angular intervals, or a plurality of catching teeth are provided at unequal intervals.

Although the catching teeth may merely project toward the center of the plunge hole substantially in parallel with the interior trim part, when the tip side portions of the catching teeth are inclined toward the direction in which the cushion material is plunged, for example, the operation to plunge the cushion material into the plunge hole at the central area thereof is facilitated and the insertion portion is well caught by the catching teeth when a force in the direction of detachment is applied to the cushion material, so that detachment of the insertion portion is more effectively prevented and the cushion material is therefore fastened firmly. With regard to the inclination, the entire catching teeth may be inclined or alternatively, the catching teeth may be such that the surfaces of the catching teeth on the side to be in contact with the cushion material are made inclined surfaces and the thickness of the catching teeth is reduced toward the tips of the catching teeth.

As the shape of the tip of each of the catching teeth in a plan view viewed along the center axis of the plunge hole, various shapes may be adopted, such as a rectangular shape, a trapezoidal shape, a convex circular arc shape, or a concave circular arc shape, etc. However, the tip of each of the catching teeth may have a triangular shape with an acute apex in a plan view so that the tips bite into the insertion portion of the cushion material and the insertion portion of the cushion material is caught so as to be prevented from being detached. The catching teeth may be provided such that a plurality of triangles are arranged in a saw-tooth form.

The plurality of catching teeth are formed integrally with the interior trim part by injection molding, for example. However, the plurality of teeth may be separately formed and integrally fixed to the interior trim part by insert molding, adhesion, welding, etc. It is preferable that at each of the cushion material fastening portions of the interior trim part, a hollow protruding portion be formed so that the plunge hole and the plurality of catching teeth are provided at the level raised from the body of the interior trim part by a predetermined dimension, and the insertion portion of the cushion material plunged into the plunge hole be accommodated in the protruding portion. However, the catching teeth and the plunge hole may be directly provided in the plate-like body portion of the interior trim part. In this case, the insertion portions are exposed on the side opposite to the side on which the cushion material is disposed and therefore, a cover or the like may be provided, as needed, that covers the insertion portion, for example.

The hollow protruding portion has a cylindrical shape adapted to the plunge hole, for example, and the plunge hole and the catching teeth are provided at the end portion of the cylindrical protruding portion. However, as long as the shape is such that the plunge hole and the catching teeth can be provided at the end portion, the cross section of the protruding portion may have a U shape or a polygonal frame shape, such as a rectangular frame shape, for example. When part of the side wall is opened, such as the cross section of the protruding portion having a U shape or a squarish U shape, it is possible to integrally form the hollow protruding portion and the interior trim part with the use of a slide mold or the like. When the protruding portion is separately formed and integrally fixed to the interior trim part by adhesion, welding, etc., a hollow protruding portion that has a closed-section side wall, such as a cylindrical wall or a polygonal frame-shaped wall may be adopted.

Depending on the material for the cushion material, there is a possibility that when the cushion material is plunged into the plunge hole at the central area thereof, a tension (tensile force) in the direction in which other portions of the insertion portion of the cushion material are drawn toward the central area of the plunge hole is generated and a positional deviation of the cushion material is therefore caused. For this reason, it is preferable that a cut or a slit (aperture) be provided in advance around the plunged portion that will become the insertion portion and when the cushion material is plunged into the plunge hole, the cut or the slit is opened to relax the tension, so that the positional deviation of the cushion material is suppressed. It is preferable that the cuts or the slits be provided at a plurality of portions around the plunged portion. It suffices that the cut or the slit is adequately provided around the plunged portion, and high positional accuracy is not necessarily required.

Figure 7A:
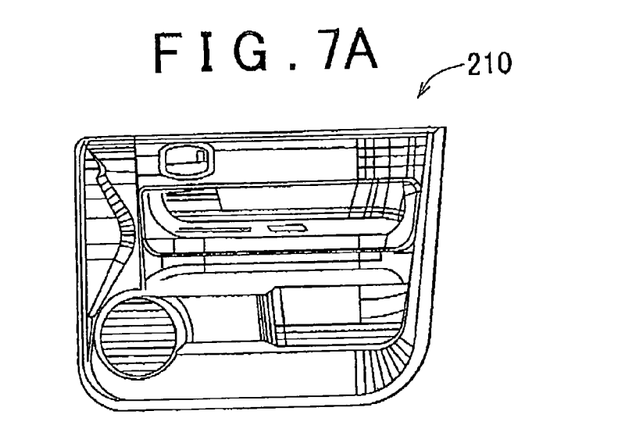
FIG. 7A is a schematic diagram showing a design surface side of an example of a vehicle door trim to which the invention is applied.
Figure 7B:
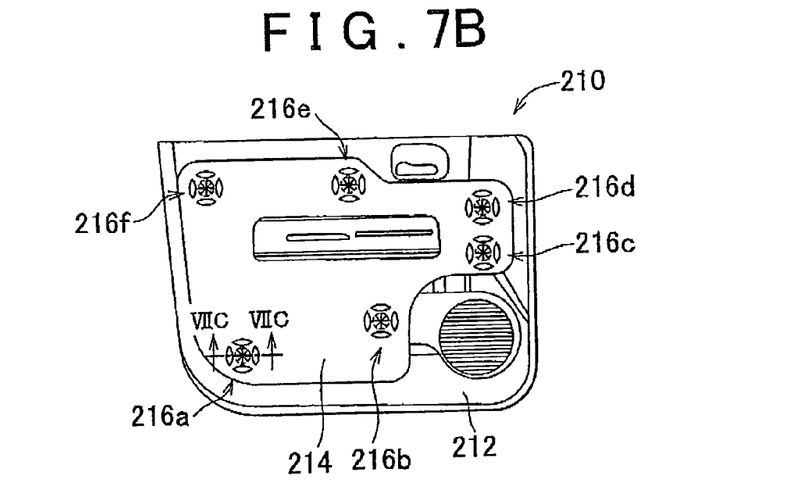
FIG. 7B is a schematic diagram showing a back side of the example of the vehicle door trim to which the invention is applied.
Figure 7C:
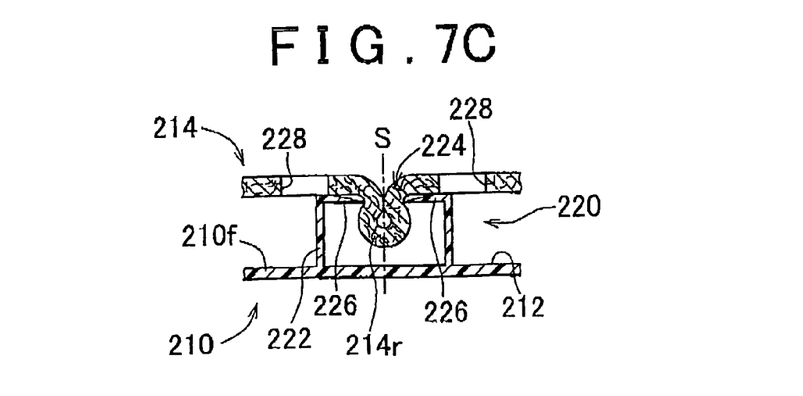
FIG. 7C is an enlarged view of the section VIIC-VIIC in FIG. 7B.

The fourth embodiment of the invention will be described in more detail below with reference to the drawings. FIGS. 7A to 7C are schematic diagrams showing a vehicle door trim 210 to which the invention is applied. FIG. 7A is a front view showing a design surface side, that is, the vehicle's cabin side of the door trim. FIG. 7B is a back view showing the opposite, back side of the door trim. FIG. 7C is an enlarged view of the section VIIC-VIIC in FIG. 7B. The vehicle door trim 210 corresponds to the interior trim part. The vehicle door trim 210 is integrally formed of a synthetic resin material and a cushion material 214 is fastened to a back side 212 of the vehicle door trim 210 that is positioned in the door (outer side with respect to the vehicle's cabin). The cushion material 214 is a flexible, sheet-shaped material, such as a felt, having a function of sound insulation or shock absorption. In the fourth embodiment, the cushion material 214 is caught by catching portions 220 that are integrally provided on the vehicle door trim 210 at six fastening portions 216a to 216f in the peripheral area, so that the cushion material 214 is integrally fastened.

Figure 8A:
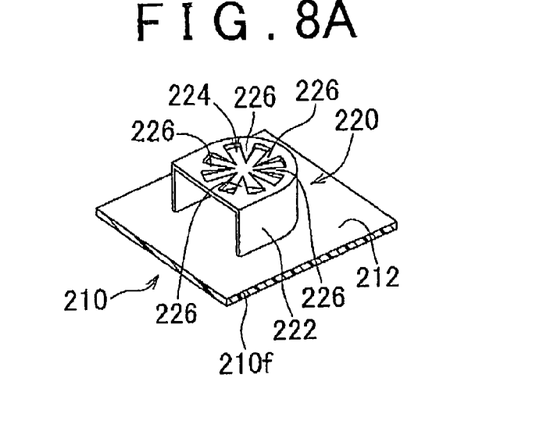
FIG. 8A is a schematic diagram, which is a perspective view showing a catching portion provided on the vehicle door trim, for explaining a cushion material fastening structure for the vehicle door trim shown in FIGS. 7A to 7C.
Figure 8B:
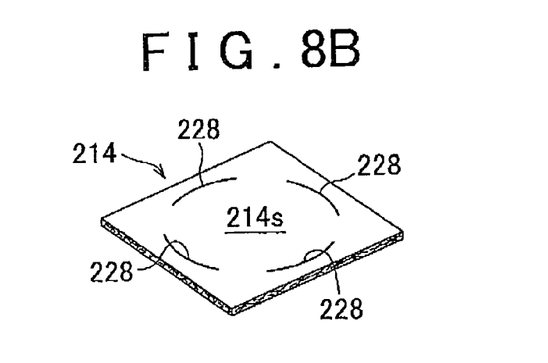
FIG. 8B is a schematic diagram, which is a perspective view showing the portion of the cushion material that is caught by the catching portion, for explaining the cushion material fastening structure for the vehicle door trim shown in FIGS. 7A to 7C.
Figure 8C:
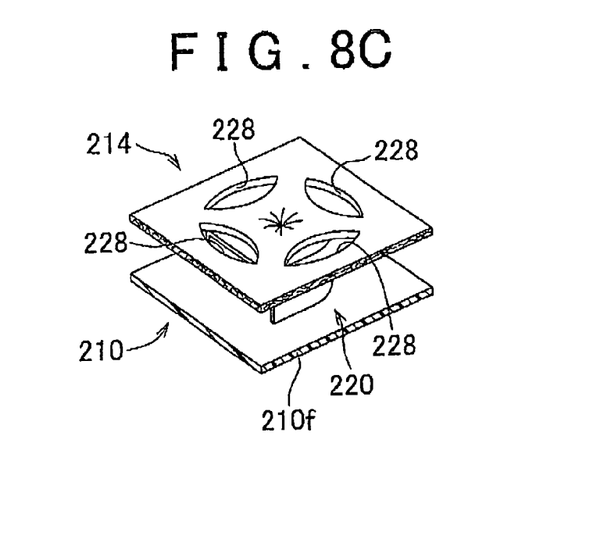
FIG. 8C is a schematic diagram, which is a perspective view showing a state in which the cushion material is caught by the catching portion, for explaining the cushion material fastening structure for the vehicle door trim shown in FIGS. 7A to 7C.

FIGS. 8A to 8C are schematic diagrams for explaining a cushion material fastening structure for fastening the cushion material 214 to the vehicle door trim 210. FIG. 8A is a perspective view showing the portion of the vehicle door trim 210, in which the catching portion 220 is provided. FIG. 8B is a perspective view showing the portion of the cushion material 214 that is caught by the catching portion 220 (the fastening portion 216a shown in FIG. 7B, for example). FIG. 8C is a perspective view showing a state in which the cushion material 214 is caught by the catching portion 220. The catching portion 220 is provided on a flat portion 210f that is a relatively flat portion of the vehicle door trim 210. The main body of the catching portion 220 is a hollow protruding portion 222 that is provided on the flat portion 210f. The hollow protruding portion 222, which is a hollow protruding portion having a U-shaped cross section, is provided on the flat portion 210f so as to stand substantially perpendicularly to the flat portion 210f and formed integrally with the vehicle door trim 210 with the use of a slide mold.

At the tip portion of the hollow protruding portion 222, that is, the position raised from the flat portion 210f, which is the body of the vehicle door trim 210, by a predetermined dimension, a plunge hole 224 into which the cushion material 214 is plunged is formed and a plurality of catching teeth 226 that project toward the center S of the plunge hole 224 are provided at predetermined intervals. Eight catching teeth 226 are provided around the center S of the plunge hole 224 at equal angular intervals and those of the catching teeth 226 positioned symmetrically with respect to the center S of the plunge hole 224 constitute a pair of holding lugs provided so as to face each other and symmetrically hold, from respective opposing sides, a substantially spherical insertion portion 214r (see FIG. 7C) of the cushion material 214 that is plunged into the plunge hole 224 at the center S thereof, in a squeezed manner, to prevent the insertion portion 214r from being detached. In this embodiment, four catching teeth 226 hold the insertion portion 214r substantially evenly around the center S of the plunge hole 224 and prevent the insertion portion 214r from being detached. The insertion portion 214r is accommodated in the hollow protruding portion 222.

The catching teeth 226 are provided substantially in parallel with the flat portion 210f of the vehicle door trim 210, and the upper surface of the tip portion of the catching teeth 226, that is, the surface thereof to be in contact with the cushion material 214 is made oblique or curved obliquely in the direction, in which the cushion material 214 is plunged, toward the tip side, and the thickness of the catching teeth 226 is reduced toward the tip thereof. Thus, the catching teeth 226 can be deformed elastically, the elastic deformation allows the cushion material 214 to be plunged, and it is possible to smoothly plunge the cushion material 214 owing to the oblique surface. In addition, when a force in the direction of detachment is applied to the cushion material 214, the insertion portion 214r is well caught by the catching teeth 226, so that detachment of the insertion portion 214r is more effectively prevented and the cushion material 214 is therefore fastened firmly.

The tip of each of the catching teeth 226 has a triangular shape with an acute apex in a plan view viewed along the center axis of the plunge hole 224 and these tips bite into the insertion portion 214r of the cushion material 214, so that detachment of the insertion portion 214r is more effectively prevented.

Meanwhile, there is a possibility that when the cushion material 214 is plunged into the plunge hole 224 at the center S thereof in a squeezed manner, a tension (tensile force) in a direction in which other portions of the insertion portion of the cushion material 214 are drawn toward the center S of the plunge hole 224 is generated and a positional deviation is caused. Thus, a plurality of circular arc cuts 228 are provided in advance around a plunged portion 214s (see FIG. 8B), which will become the insertion portion 214r, and when the plunged portion 214s is plunged into the plunge hole 224, the cuts 228 are opened to relax the tension, so that the positional deviation of the cushion material 214 is suppressed. A plurality of cuts 228 (four in this embodiment) are provided around the plunged portion 214s at equal angular intervals. The tension is relaxed substantially evenly all around the insertion portion 214r. FIG. 7C and FIG. 8C both show a state in which the cuts 228 are opened. Note that the cuts 228 may be adequately provided around the plunged portion 214s and high accuracy in positioning is not necessarily required.

Figure 9A:
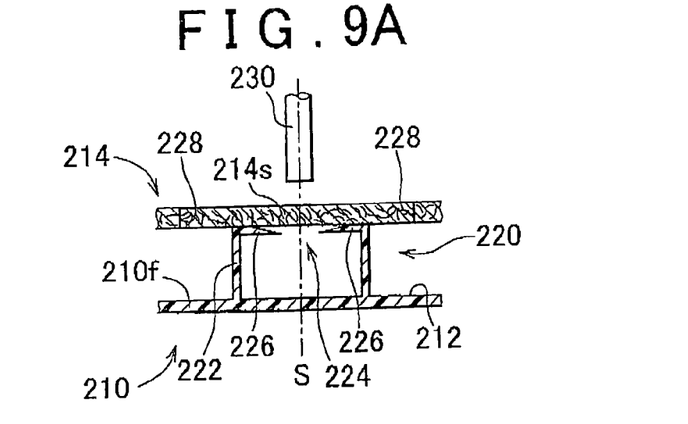
FIGS. 9A to 9C are diagrams, which are sectional views corresponding to FIG. 7C, for explaining the procedure for fastening the cushion material in such a manner that the cushion material is held by the catching portion of the vehicle door trim.
Figure 9B:
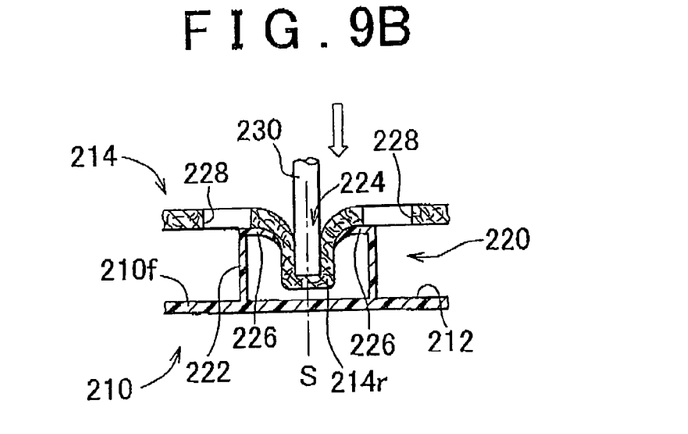
Figure 9C:
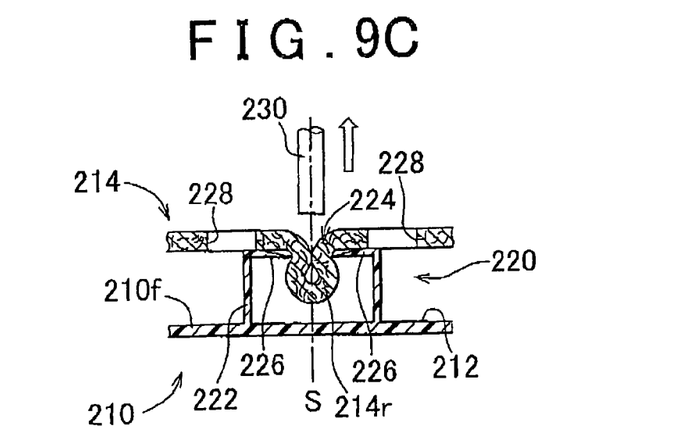

FIGS. 9A to 9C are diagrams for explaining the procedure for fastening the cushion material 214 in such a manner that the cushion material 214 is held by the catching portion 220. First, as shown in FIG. 9A, the cushion material 214 is placed flat at the predetermined position on the vehicle door trim 210 that is placed upside down so that the back side 212 faces upward. Then, a cylindrical plunging tool 230 is used to plunge, into the plunge hole 224, the plunged portion 214s that is positioned directly above the center S of the plunge hole 224 as shown in FIG. 9B. As a result, mainly the middle portion inside the cuts 228 of the cushion material 214 is plunged into the plunge hole 224 at the center S thereof in a squeezed manner while the catching teeth 226 are elastically deformed downward, and the insertion portion 214r protrudes inside the hollow protruding portion 222. When the plunged portion 214s is plunged into the plunge hole 224, the cuts 228 are opened to relax the tension in the direction in which other portions of the insertion portion of the cushion material 214 are drawn toward the plunge hole 224, so that the positional deviation of the cushion material 214 is suppressed. The insertion portion 214r is properly held by the elastic restoring force of the plurality of catching teeth 226, and even after the plunging tool 230 is pulled out upward as shown in FIG. 9C, the insertion portion 214r of the cushion material 214 is held by a predetermined, detachment prevention force of the plurality of catching teeth 226, prevented from being detached, and is held, in a substantially spherical shape, inside the hollow protruding portion 222.

Although the plunging tool 230 may be manually operated by an operator under visual observation to plunge the cushion material 214 into the plunge hole 224 at the center S, the plunging tools 230 may be fixed in advance, above the assembling table on which the vehicle door trim 210 is positioned and placed at the predetermined position, at the predetermined points on a movable block that is lifted up and down by a driving device, such as an air cylinder or a screw feeding mechanism, that is, directly above the centers S of the plunge holes 224, and the plunged portions 214s of the cushion material 214 may be plunged into the plunge holes 224 by moving down the movable block. If the plunging tools 230 are installed at the six positions corresponding to the fastening portions 216a to 216f, it is possible to plunge the cushion material 214 into the plunge holes 224 at the six fastening portions 216a to 2161 at the same time to fasten the cushion material 214 at the catching portions 220.

As described above, the plurality of catching portions 220 are integrally provided, corresponding to the plurality of fastening portions 216a to 216f, on the back side 212 of the vehicle door trim 210 in the fourth embodiment, and the cushion material 214 is integrally fastened at the plurality of fastening portions 216a to 216f. In this case, each of the catching portions 220 includes the plunge hole 224 and the plurality of catching teeth 226. The cushion material 214 is plunged into the plunge hole 224 at the center S while the catching teeth 226 are elastically deformed, so that the insertion portion 214r is caught by the plurality of catching teeth 226 and prevented from being detached. Thus, it is possible to fasten the cushion material 214 by placing it flat at the predetermined position on the vehicle door trim 210 and plunging the plunged portion 214s, positioned above the plunge hole 224, into the plunge hole 224 at the center S with the use of the plunging tool 230 as shown in FIGS. 9A to 9C, so that it is possible to easily and properly fasten the cushion material 214 at the predetermined position without requiring high accuracy in positioning.

In the fourth embodiment, four pairs of the catching teeth 226, each pair consisting of two catching teeth 226 provided symmetrically with respect to the center S of the plunge hole 224, are provided around the center S of the plunge hole 224 at equal angular intervals. Thus, the insertion portion 214r, which is the portion plunged into the plunge hole 224 at the center S, is caught such that the insertion portion 214r is symmetrically held by the four pairs of catching teeth 226, that is, the eight catching teeth 226, from opposing sides. Thus, the force of preventing detachment of the insertion portion 214r, that is, the strength against removal of the cushion material 214 is obtained substantially evenly around the center S of the plunge hole 224 and the cushion material 214 is more firmly fastened and prevented from being detached from the vehicle door trim 210.

In the fourth embodiment, the upper surface of the plurality of catching teeth 226, that is, the surface thereof on the side to be in contact with the cushion material 214 is made oblique in the direction, in which the cushion material 214 is plunged, toward the tip side, and the thickness of the catching teeth 226 is reduced toward the tip side. Thus, the catching teeth 226 are easily deformed elastically and the cushion material 214 is smoothly plunged into the plunge hole 224, so that the plunging operation is facilitated. Meanwhile, when a force in the direction of detachment is applied to the spherical insertion portion 214r of the cushion material 214, the insertion portion 214r is well caught by the catching teeth 226, so that detachment of the insertion portion 214r is more effectively prevented and the cushion material 214 is firmly fastened.

In the fourth embodiment, the tip of each of the catching teeth 226 has a triangular shape with an acute apex in a plan view viewed along the center axis of the plunge hole 224 and these tips bite into the insertion portion 214r of the cushion material 214, so that detachment of the insertion portion 214r is more effectively prevented.

In the fourth embodiment, a plurality of cuts 228 are provided in advance around the plunged portion 214s of the cushion material 214. When the plunged portion 214s is plunged into the plunge hole 224, the cuts 228 are opened, so that the tension (tensile force) applied in the direction in which other portions of the insertion portion of the cushion material 214 are drawn toward the plunge hole 224 is relaxed and the positional deviation of the cushion material 214 is suppressed.

Although embodiments of the invention have been described in detail with reference to drawings, these embodiments are merely examples, and the invention can be implemented in various forms obtained by altering or modifying the embodiments based on the knowledge of those skilled in the art.

What is claimed is:

1. A cushion material fastening structure comprising:
an interior trim part, made of synthetic resin, that is provided with a slit-shaped opening, an elastic deformation portion at least part of which projects inward in the slit-shaped opening, a plate-shaped catching protrusion and a plate-shaped holding portion,
wherein at least one of the plate-shaped catching protrusion and the plate-shaped holding portion functions as the elastic deformation portion, and the plate-shaped catching protrusion is provided with a catching lug that projects toward the plate-shaped holding portion in such a manner that the slit-shaped opening is formed between the catching lug and the plate-shaped holding portion; and
a cushion material, having a sheet shape, that is caught by the elastic deformation portion by being plunged into the slit-shaped opening with a plunged portion of the cushion material folded while elastically deforming the elastic deformation portion,
wherein the cushion material is plunged into the slit-shaped opening while one or both of the plate-shaped catching protrusion and the plate-shaped holding portion are elastically deformed, and an insertion portion of the cushion material that is inserted into the slit-shaped opening is caught in a state where the insertion portion is pinched between the catching lug and the plate-shaped holding portion, and the cushion material has a cut that is formed near the plunged portion and is substantially parallel to the slit-shaped opening, and
wherein the cushion material is fastened to the interior trim part.

2. The cushion material fastening structure according to claim 1, wherein a plurality of triangular teeth are continuously provided at a tip of the catching lug.

3. The cushion material fastening structure according to claim 1, wherein the holding portion is provided with a catching lug that projects toward the catching protrusion substantially symmetrically with the catching lug provided for the catching protrusion, and the opening is formed between tips of the respective catching lugs of the catching protrusion and the holding portion.

4. The cushion material fastening structure according to claim 3, wherein a plurality of triangular teeth are continuously provided at the tip of at least one of the catching lugs.

5. The cushion material fastening structure according to claim 1, wherein the holding portion is a peripheral wall or a rib of the interior trim part.

6. The cushion material fastening structure according to claim 5, wherein a plurality of triangular teeth are continuously provided at a tip of the catching lug.

7. The cushion material fastening structure according to claim 1, wherein
the elastic deformation portion is a plurality of catching teeth that project inward in the opening, and
the cushion material is plunged into the opening at a central area of the opening while the plurality of catching teeth are elastically deformed, and an insertion portion of the cushion material that is plunged into the opening is caught by the plurality of catching teeth and prevented from being detached.

8. The cushion material fastening structure according to claim 7, wherein the plurality of catching teeth include at least two pairs of the catching teeth provided around a center of the opening at equal angular intervals, each pair of the catching teeth including two catching teeth that are provided symmetrically with respect to the center of the opening.

9. The cushion material fastening structure according to claim 1, wherein a flange of the plate-shaped catching protrusion and a flange of the plate-shaped holding portion are each directed inward toward the slit-shaped opening.

10. The cushion material fastening structure according to claim 1, wherein a flat portion of the interior trim part has a substantially constant thickness.

11. The cushion material fastening structure according to claim 1, wherein the plate-shaped catching protrusion and the plate-shaped holding portion converge toward each other.

* * * * *